May 14, 1929.  F. L. THAMERUS  1,713,152
GRAPEVINE BRUSH REMOVER
Filed Nov. 8, 1926
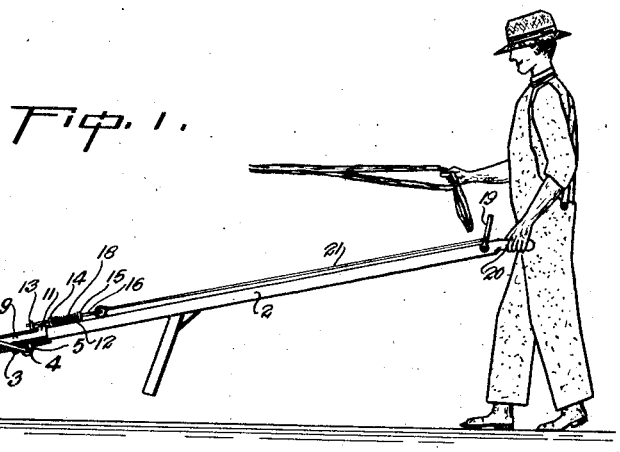
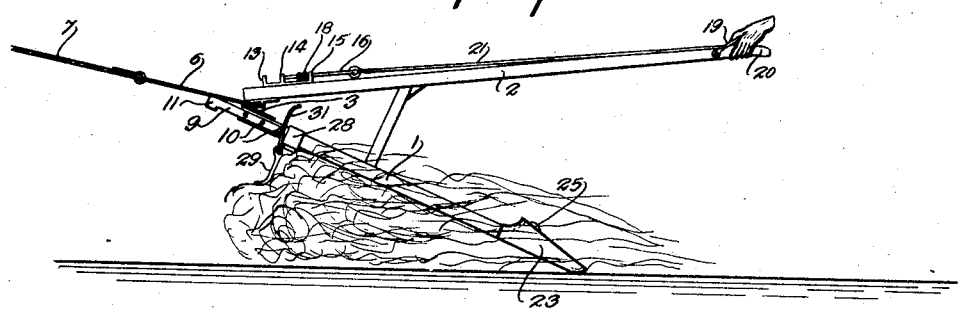
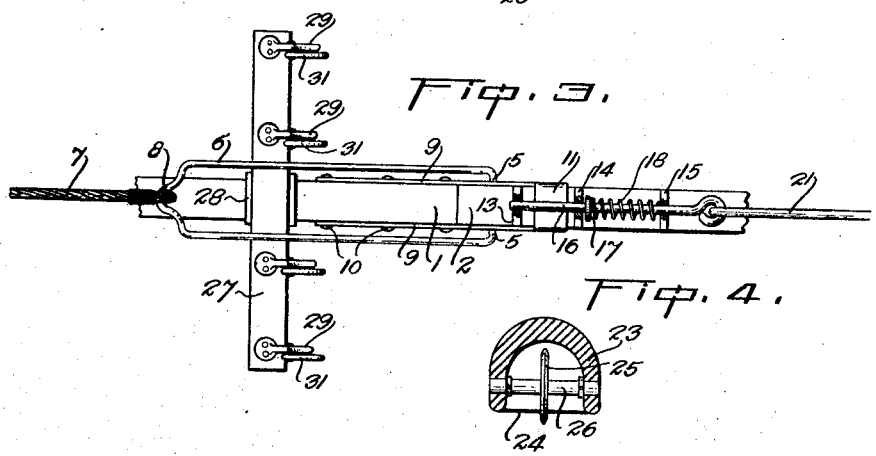
INVENTOR
FREDERICK L. THAMERUS.

Patented May 14, 1929.

1,713,152

UNITED STATES PATENT OFFICE.

FREDERICK LEWIS THAMERUS, OF BUFFALO, NEW YORK.

GRAPEVINE-BRUSH REMOVER.

Application filed November 8, 1926. Serial No. 147,113.

My invention relates to improvements in implements for removing pruned grape vine brush from between rows of vines and the object of the invention is to replace the usual horse drawn inclined pole which is usually used for this purpose with an improved implement which is capable of discharging the brush at the end of the furrow without tipping it as is necessary when the ordinary pole is used. A further object of the invention is to provide my implement with gathering prongs so as to insure a thorough collection of all the brush, and another object of the invention is to so construct my implement that the entire manipulation thereof only requires the use of one hand of the operator thus leaving the other hand free for guiding and controlling the horse. A still further object of the invention is to provide a thin soil-entering running wheel in the front end of the implement which will thus permit the operator steering it in any desired direction without substantially changing the course of the horse.

My invention consists of a grape brush removing implement constructed and arranged all as hereinafter more particularly described and illustrated in the accompanying drawing in which:

Fig. 1 is a side elevational view of my device supported by the operator, the horse not being shown.

Fig. 2 is a similar view to Figure 1 showing my device discharging the brush that has been collected.

Fig. 3 is a plan view of an enlarged fragmentary part of the center portion of the implement showing the lock for controlling the forward swingable brush engaging end and also the brush collecting prongs which are mounted on such forward end, and, Fig. 4 is a vertical cross sectional view through the toe of the implement disclosing the soil-engaging running wheel disposed therein.

Like characters of reference indicate corresponding parts in the different views.

My invention essentially consists of a pair of bar members 1 and 2 connected together in alignment by means of a hinge 3 which is secured to the undersides thereof at the abutting ends, the hinge portion which is secured to the bar member 2 being provided with a pair of downwardly extending lugs 4 one on each side thereof, such lugs having orifices therein adapted to receive the turned in ends 5 of a U-shaped member 6 which extends upwardly therefrom, swinging clear of both bar members, the horse trace 7 being adapted to be secured to the forward end 8 thereof.

9 are a pair of rectangularly shaped plates adapted to be secured one upon each side of the bar member 1 in the vicinity of its upper end by means of rivets 10, such plates extending along the sides of the lower adjacent end of the bar member 2, and 11 is an integrally formed bridge-piece extending between the upper ends of the plates 9 above the upper face of the bar member 2. 12 is a plate secured upon the lower end of the upper face of the bar member 2 and provided with three upwardly extending spaced apart lugs 13, 14 and 15, the bridge-piece 11 being adapted to be normally positioned between the lugs 13 and 14 when the implement is in the brush gathering position, and 16 is a bolt normally extending through three aligned orifices in the lugs and passing over the upper face of the bridge-piece 11. For retaining such bolt 16 in the locked or functioning position I furnish a collar 17 thereon being positioned in close proximity to the lug 14, and 18 is a spiral spring encircling the bolt and extending between such collar 17 and the lug 15. For operating the plunging movement of the bolt a swingable manually actuated handle 19 is provided upon the upper end of the bar member 2 in proximity to the handle 20 which the operator holds and 21 is a rod extending between the swingable handle 19 and the loop upon the upper end of the bolt 16.

Upon the lower end of the bar member 1 I furnish a hollow ground engaging toe 23 the lower face 24 of which is adapted to slide upon the ground when the implement is in use, and 25 is a thin disc wheel rotatably mounted upon a spindle 26 which extends between the sides of the toe, such wheel 25 projecting a short distance below the lower face 24 of the toe and adapted to enter the soil as the toe moves forwardly.

For insuring the complete collection of all the brush lying within the path of my implement I furnish a transverse bar 27 secured upon the upper face of a strap 28 which is slidably mounted upon the bar member 1, the upper face of such transverse bar 27 being furnished with a plurality of upwardly extending and backwardly bent prongs 29. Upon the lower ends of the prongs 29 I form lugs 30 to which the upper ends of depending downwardly extending prongs 31 are pivotally secured, the lower forwardly bent ends of the prongs 31 being in close proximity to the ground. The strap 28 is slidably mounted upon the bar member 1 so that the prongs supported thereby may gradually move up such member as the brush catches and collects thereon.

The operation of my device is as follows: When it is desired to use my implement it is held in the position illustrated in Figure 1, the operator supporting it by holding the handle 20 upon the upper end of the member 2 in one hand which leaves his other hand free to guide the horse which is secured to the forward end of the trace 7. The operator drives the horse along the furrows between the rows of pruned grape vines and as the toe 23 is sloped downwardly at its forward end it will pass underneath the cut brush lying in such furrows, the brush which of course is composed of long tendrils will slide upwardly upon the upper face of the toe onto the upper face of the bar 1, any brush that the toe misses being of course caught by either set of prongs 29 or 31. As the brush collects upon the upper face of the bar 1 the prongs supported by the sleeve 28 will gradually slide upwardly upon the bar until the triangular portion formed between the upper face of the bar and the trace 7 is filled with trailing brush, the bar 2 being of sufficient length to prevent the operator treading upon any of the trailing tendrils which would of course deposit them back on the ground. When the end of the furrow has been reached and it is desired to discharge the brush collected, the operator swings the handle 19 in a clockwise direction thus pulling the bolt 16 upwardly through the medium of the rod 21 until the lower end of such bolt passes from above the upper face of the bridge member 11. Immediately the bolt has been moved out of engagement with the bridge member the bar member 1 will be permitted to swing in respect to the bar member 2, as when the operator slightly elevates the bar 2 the point of the toe 23 will dig into the ground under the influence of the weight of the brush thereon and upon further movement of the horse will swing into the position illustrated in Figure 2 wherein the brush will be deposited upon the ground in a compact heap, the bar member 1 sliding therefrom as the horse moves forwardly. I swingably mount the prongs 31 so that they may swing upwardly and pass any solid obstruction which may lie in their path without requiring the operator to stop the forward movement of the implement.

Upon it being desired to swing the bar member 1 back into alignment with the bar member 2 and lock it in relation thereto it is merely necessary to back the horse up when such bar member 1 will swing in a clockwise direction upon the point of the toe 23 and assume the position illustrated in Figure 1. When this has been attained the operator permits the handle 19 to swing forwardly under the influence of the spring 18 which has been in compression and the bolt will pass over the upper face of the bridge piece 11 and enter the orifice in the lug 13 thus securing the bar member 1 in its aligned position. By providing the disc wheel 25 which cuts into the ground surface I have furnished a means whereby the implement can be readily and quickly guided by swinging its rear part to one side or the other.

From the foregoing description it will be apparent that I have devised an extremely simple and efficient grape brush removing implement which is a considerable improvement over the pole which is now generally used as the point of such pole has a great tendency to dig into the ground and it is also extremely hard to remove the brush therefrom, it being necessary to tilt the whole pole upwardly and forwardly which of course very often permits its forward end falling upon the back of the horse which causes the horse to become restless as well as causing loss of time in disentangling the pole from the collected brush. By the use of my device the operator can very readily discharge the collected brush with the minimum loss of time and in backing the horse up in turning around to commence the next furrow may restore the implement to the functioning position whilst completing this movement.

What I claim as my invention is:

1. An implement of the character described, comprising a bar adapted to be manually supported at its rear end, a second ground engaging bar pivotally connected to its forward end and normally lying substantially in alignment therewith, locking means for retaining the bars in their aligned positions, a ground engaging toe piece member upon the forward end of the ground engaging bar and a ground engaging disk rotatably supported upon the toe member and adapted to project below its lower face.

2. An implement of the character described, comprising an upper bar adapted to be manually supported at its rear end, a second ground engaging bar pivotally connected to its other end and normally lying substantially in alignment therewith, a horse trace secured to the manually supported bar in the vicinity of its forward end, a pair of plates secured to the sides of the rear end of the ground engaging bar and extending along the sides of the front end of the manually supported bar, a bridge piece adapted to connect the rear ends of the plates and extend over the upper face of the manually supported bar, a bolt mounted upon the forward end of the upper face of the manually supported bar, and adapted to extend over the bridge piece to constitute a locking means therewith to normally retain the bars in their aligned position, and a manual bolt actuating handle mounted upon the upper bar whereby the bolt may be withdrawn from engagement with the bridge piece to permit the lower bar to swing rearwardly to deposit the collected brush under the forward movement of the horse.

3. An implement of the character described, comprising an upper bar adapted to be manually supported at its rear end, a second ground engaging bar pivotally connected to its front end and normally lying substantially in alignment therewith, a horse trace secured to the manually supported bar in the vicinity of its forward end, a plurality of prongs slidably mounted upon the ground engaging bar and adapted to move rearwardly thereon as the brush collects, a pair of plates secured to the sides of the rear end of the ground engaging bar and extending along the sides of the front end of the manually supported bar, a bridge piece adapted to connect the rear ends of the plates and extend over the upper face of the manually supported bar, a bolt mounted upon the forward end of the upper face of the manually supported bar and adapted to extend over the bridge piece to constitute a locking means therewith to normally retain the bars in their aligned position, and a manual bolt actuating handle mounted upon the upper bar whereby the bolt may be withdrawn from engagement with the bridge piece to permit the lower bar to swing rearwardly to deposit the collected brush under the forward movement of the horse.

4. An implement of the character described, comprising a pair of bars hingedly connected together and adapted to normally lie in alignment with each other to form a rigid unit, the forward end of the unit being adapted to rest upon the ground and the rear end to be manually supported so that the unit is rearwardly and upwardly inclined, a horse trace connected to the upper bar in the vicinity of its lower end whereby the implement is drawn forwardly by the horse, a manually actuated lock for retaining the bars in their aligned positions when the implement is drawn forwardly by the horse in collecting the brush upon the lower bar, and a manual lock actuating handle mounted upon the upper bar whereby the lock may be disengaged to permit the lower bar to swing rearwardly to deposit the collected brush under the forward movement of the horse.

5. An implement of the character described, comprising a pair of bars hingedly connected together and adapted to normally lie in alignment with each other to form a rigid unit, the forward end of the unit being adapted to rest upon the ground and the rear end to be manually supported so that the unit is rearwardly and upwardly inclined, a horse trace connected to the upper bar in the vicinity of its lower end, a transverse bar slidably mounted upon the lower bar, a plurality of spaced apart prongs on the transverse bar, a manually actuated lock for retaining the bars in their aligned positions when the implement is drawn forwardly by the horse in collecting the brush, and a manual lock actuating handle mounted upon the upper bar whereby the lock may be disengaged to permit the lower bar to swing rearwardly to deposit the collected brush under the forward movement of the horse.

6. An implement of the character described, comprising a pair of bars hingedly connected together and adapted to normally lie in alignment with each other to form a rigid unit, the forward end of the unit being adapted to rest upon the ground, the rear end to be manually supported so that the rear end is rearwardly and upwardly inclined, a horse trace connected to the upper bar in the vicinity of its lower end whereby the horse draws the implement forwardly, a transverse bar slidably mounted upon the lower bar, a plurality of spaced apart vertically extending prongs hingedly mounted upon the transverse bar, a manually actuated lock for retaining the bars in their aligned positions when the implement is drawn forwardly by the horse in collecting the brush, and a manual lock actuating handle mounted upon the upper bar whereby the lock may be disengaged to permit the lower bar to swing rearwardly to deposit the collected brush under the forward movement of the horse.

FREDERICK LEWIS THAMERUS.